(12) United States Patent
Feng et al.

(10) Patent No.: US 10,688,889 B2
(45) Date of Patent: Jun. 23, 2020

(54) MOTOR VEHICLE SEAT ROTATION MECHANISM

(71) Applicant: Adient Engineering and IP GmbH, Burscheid (DE)

(72) Inventors: Qingwei Q. Feng, Shanghai (CN); Dahai Qian, Shanghai (CN); Shuai Xu, Shanghai (CN); Feixiang Zhu, Shanghai (CN); Xun Tang, Shanghai (CN)

(73) Assignee: Adient Engineering and IP GmbH, Burscheid (DE)

( * ) Notice: Subject to any disclaimer, the term of this patent is extended or adjusted under 35 U.S.C. 154(b) by 0 days.

(21) Appl. No.: 16/201,010

(22) Filed: Nov. 27, 2018

(65) Prior Publication Data

US 2019/0160977 A1 May 30, 2019

(30) Foreign Application Priority Data

Nov. 28, 2017 (CN) .......................... 2017 1 1218807

(51) Int. Cl.
*B60N 2/00* (2006.01)
*B60N 2/14* (2006.01)
*B60N 2/427* (2006.01)
*A47C 3/18* (2006.01)

(52) U.S. Cl.
CPC ............... *B60N 2/146* (2013.01); *B60N 2/14* (2013.01); *B60N 2/42736* (2013.01); *A47C 3/18* (2013.01)

(58) Field of Classification Search
CPC ........ B60N 2/146; B60N 2/14; B60N 2/0818; B60N 2/236; B60N 2/0705

USPC .......... 248/425; 297/344.21, 344.22, 344.23, 297/344.24, 344.25, 344.26
See application file for complete search history.

(56) References Cited

U.S. PATENT DOCUMENTS

| 3,338,622 | A |   | 8/1967  | Bachmann |              |
|-----------|---|---|---------|----------|--------------|
| 5,685,514 | A | * | 11/1997 | Carnahan | A47B 11/00   |
|           |   |   |         |          | 248/349.1    |
| 6,021,989 | A | * | 2/2000  | Morita   | B60N 2/143   |
|           |   |   |         |          | 248/349.1    |

(Continued)

FOREIGN PATENT DOCUMENTS

| CN | 1189343 C    | 2/2005 |
| CN | 103863151 A  | 6/2014 |

(Continued)

*Primary Examiner* — Steven M Marsh
(74) *Attorney, Agent, or Firm* — Marshall & Melhorn, LLC.

(57) ABSTRACT

A motor vehicle seat rotation mechanism includes a connecting plate connected to a seat, a moving plate, located below the connecting plate and connected to the connecting plate, and a fixed plate, located below the moving plate and connected to an upper slide rail in a seat slide rail assembly. An upper ball assembly is located between a press plate and the moving plate. A lower ball assembly is located between the moving plate and the fixed plate. A lower anti-detachment hook ring is located between the connecting plate and the fixed plate and fixed to the fixed plate. An annular lower anti-detachment hook is provided at an inner edge of the lower anti-detachment hook ring. An annular upper anti-detachment hook is provided at an outer edge of the moving plate. The lower anti-detachment hook and the upper anti-detachment hook are engaged with each other.

15 Claims, 14 Drawing Sheets

(56) References Cited

U.S. PATENT DOCUMENTS

| | | | | |
|---|---|---|---|---|
| 9,211,812 B2* | 12/2015 | Haller | .................... | B60N 2/015 |
| 9,227,529 B2* | 1/2016 | Haller | .................... | B60N 2/508 |
| 2008/0163717 A1 | 7/2008 | Weber | | |
| 2008/0211284 A1 | 9/2008 | Mutou et al. | | |
| 2014/0167469 A1* | 6/2014 | Haller | .................... | B60N 2/06 |
| | | | | 297/344.12 |

FOREIGN PATENT DOCUMENTS

| | | |
|---|---|---|
| CN | 106427682 A | 2/2017 |
| CN | 206186835 U | 5/2017 |
| DE | 4203150 A1 | 8/1993 |
| JP | H10230763 A | 9/1998 |
| JP | 2002067754 A | 3/2002 |

\* cited by examiner

MOTOR VEHICLE SEAT ROTATION MECHANISM

CROSS REFERENCE TO RELATED APPLICATIONS

This application claims the benefit of priority under 35 U.S.C. § 119 of China Application 201711218807.2, filed Nov. 28, 2017, the entire contents of which are incorporated herein by reference.

TECHNICAL FIELD

The present invention relates to the technical field of motor vehicle seats, in particular to a motor vehicle seat rotation mechanism.

BACKGROUND ART

At present, rotation mechanisms used to enable the rotation of a motor vehicle seat around a perpendicular axis can be split into two types according to rotation medium, namely rolling rotation mechanisms and sliding rotation mechanisms. In a rolling rotation mechanism, multiple hard balls which have been set in a retaining frame in advance are used as the rotation medium, enabling a moving plate to rotate in an annular track formed by an upper row of balls and a lower row of balls. In order to increase separation strength, an upper anti-detachment hook is mounted on the moving plate, and a lower anti-detachment hook is mounted on a fixed plate; when subjected to a force, the upper and lower anti-detachment hooks hook into each other, and are used to enhance the anti-separation function of the rotation mechanism.

The technical solution described above is known art in this field; reference may be made to Chinese invention patents CN 106427682 A and CN 97114364.1.

Referring to FIG. 1, a ball and ball track force-bearing structure in CN 106427682 A is worthy of discussion. Upper steel balls 1 are radially offset from lower steel balls 2 by an amount AA; under a pressing action, a ball track surface 4 of a moving plate 3 has the tendency to deform downwards, with the lower steel balls 2 beneath as a pivot point and AA as an arm of force, i.e. the relationship between the upper steel balls 1 and the lower steel balls 2 is unable to achieve a cancellation effect whereby two forces are equal in magnitude and opposite in direction. Furthermore, under a pressing action, a locking claw 5 has the tendency to come out of a locking hole 6 in the moving plate 3 and a locking hole 9 in a press plate 7 (the press plate 7 being connected in a fixed manner to a fixed plate 8), and under a pulling action, the lower steel balls 2 have the tendency to leave a ball track. The former will give rise to a safety problem; the latter is a functional problem, and is worthy of improvement here.

Referring to FIG. 2, upper steel balls 10 and lower steel balls 11 in CN 97114364.1 are also affected by the problem which affects patent CN 106427682 A.

In the case of a luxury MPV, referring to FIGS. 3 and 4, there is an ever-increasing number of fittings on an independent middle-row seat 12 (with increased weight); at the same time, in order to meet comfort needs, two fixing points which were previously mounted on the vehicle body are fitted to the seat—this is a so-called ABTS seat. Such a structure, in which all three fixing points are on the seat, places higher demands on the rotation mechanism in terms of anti-separation strength, which is generally 2000 Nm or more. In the known art, the separation strength is increased through the engagement of upper anti-detachment hooks 13 with lower anti-detachment hooks 14; however, since the lower anti-detachment hooks 14 are four independent lower anti-detachment hooks 14, and since the four independent lower anti-detachment hooks 14 are disconnected from one another, it is very difficult for the four lower anti-detachment hooks 14 to act in synergy. If the upper anti-detachment hook 13 detaches from one of the lower anti-detachment hooks 14, the entire structure will rapidly collapse; unless the hook contact area is increased, it will be very difficult to break through the 2000 Nm bottleneck. A squeezing effect on a moving plate ball track is formed between two steel balls, i.e. a lower steel ball serves as a pivot point for a moving plate rolling surface.

Furthermore, referring to FIG. 1, a height H of a conventional rolling rotation mechanism in a perpendicular direction is high, because in general, an anti-detachment hook 5 between the moving plate 3 and the press plate 7 must be riveted or connected by bolts, and tool space for riveting and torque guns places requirements on the height H. At the same time, space must also be left for movement of a pawl, and the moving plate and press plate must both have high folded edges. Generally, the height H is 45 mm or more.

In the prior art described above, a conflict exists between increasing the separation strength and reducing the height H of the rolling rotation mechanism in the perpendicular direction, because in order to increase the separation strength, it is necessary for an action surface of the anti-detachment hook to be designed to be higher, and the corresponding rotation mechanism height will also become higher.

After adjustment of a seat rotation mechanism, a fixed plate and a moving plate are fixed by means of a locking device. Referring to FIG. 1, in the case of a locking device in CN 106427682 A, the locking claw 5 is flipped down and inserted into the locking hole 5 in the moving plate 3 and the locking hole 9 in the press plate 7 (the press plate 7 being connected in a fixed manner to the fixed plate 8). Since the locking claw 5 is mounted on the moving plate 3, and in order to arrange the locking hole 6 and the locking hole 9, edges of the moving plate 3 and the press plate 7 must extend upward, forming high folded edges 15 and 16, and resulting in a thick overall profile.

Referring to FIGS. 5 and 6, in the case of another locking device disclosed in CN 103863151 in the prior art, the locking device 17 is positioned between a fixed plate 18 and a moving plate 19, and a tooth-shaped element 20 is translationally inserted into and withdrawn from slots 21, 22 between the moving plate 189 and the fixed plate 18 to achieve locking. Such a design reduces the design height of the rotation mechanism.

Referring to FIG. 7, CN 1189343 C in the prior art discloses a similar locking device; the locking device 23 is also mounted between a fixed plate 24 and a moving plate 25. Specifically, a tooth-shaped element 26 is pulled manually, and the tooth-shaped element 26 is rotationally inserted into and withdrawn from locking holes 27, 28 between the moving plate 25 and the fixed plate 24 to achieve locking.

All of the locking devices in the known art described above employ one-piece claw-shaped or tooth-shaped members, i.e. are realized by jamming several successive protrusions into corresponding successive slots.

As is well-known, due to the effects of manufacturing precision, in the case of a profile formed by multiple polygonal line segments at different angles, profiles in actual and theoretical states cannot be completely coincident; the greater the number of protrusions, the greater the degree of non-coincidence. Two protruding/recessed components are matched to each other, and this non-coincidence is a superposition relationship, hence zero-gap fitting is always impossible; this is the problem of so-called free play, and is an intrinsic characteristic of the structure.

In the known art, unlocking operations have poor ergonomics; passengers must turn a handle from one side to achieve unlocking, but lifting the hand to achieve unlocking would have a more natural feeling and require less effort. Although a rotary handle can be changed to a pull-up handle through the use of a harness for unlocking, this has the disadvantages of low transfer efficiency, and structural redundancy.

SUMMARY

A technical problem to be solved by the present invention is to provide, in response to the abovementioned technical problems affecting existing rolling rotation mechanisms, an improved motor vehicle seat rotation mechanism, which solves various problems affecting upper and lower steel balls in a force-bearing state in conventional rolling rotation mechanisms, and realizes the arrangement of a novel anti-detachment structure within a design height of the rolling rotation mechanism in the perpendicular direction of H=32 mm, such that the anti-separation strength is greater than 2000 Nm.

Another technical problem to be solved by the present invention is to provide a motor vehicle seat rotation mechanism with an improved locking device.

Another technical problem to be solved by the present invention is to provide a motor vehicle seat rotation mechanism with an improved ball assembly.

According to a first aspect of the invention a motor vehicle seat rotation mechanism, comprising: a connecting plate connected to a seat; a moving plate, located below the connecting plate and connected in a fixed manner to the connecting plate; a fixed plate located below the moving plate, the fixed plate being connected to an upper slide rail in a slide rail assembly of the seat; a press plate, located above the moving plate and connected in a fixed manner to the fixed plate; an upper ball assembly located between the press plate and the moving plate; a lower ball assembly located between the moving plate and the fixed plate; characterized by further comprising: a lower anti-detachment hook ring, located between the connecting plate and the fixed plate, and fixed to the fixed plate, with an annular lower anti-detachment hook being provided at an inner edge of the lower anti-detachment hook ring, and an annular upper anti-detachment hook being provided at an outer edge of the moving plate, the lower anti-detachment hook and the upper anti-detachment hook being engaged with each other.

In a preferred embodiment of the present invention, the lower anti-detachment hook has an inverted U-shape, the upper anti-detachment hook has a U-shape, and the lower anti-detachment hook having the inverted U-shape is placed over the upper anti-detachment hook having the U-shape.

In a preferred embodiment of the present invention, a radial separation between a perpendicular axis on which the center of an upper ball in the upper ball assembly is located, and a perpendicular axis on which the center of a lower ball in the lower ball assembly is located, ≤0. In particular, the tangent of the upper ball is in parallel with the perpendicular axis of the upper ball and located radially outward of the upper ball with respect to the center axis of the arrangement of the rotation mechanism and the tangent of the lower ball is in parallel with the perpendicular axis of the lower ball and located radially inwards of the lower ball with respect to the center axis of the arrangement of the rotation mechanism. The radial distance between the tangents of the upper ball and the lower ball is equal or less than zero. Thus the upper and lower balls may overlap provided that the overlapping edge faces radially inwards or outwards.

In particular, in the case that $\Delta A=0$ than the tangents are identical, in particular congruent wherein the upper and lower balls do not overlap. In the case that $\Delta A<0$ than the tangents are arranged in parallel with each other and with respect to the perpendicular axis wherein the adjacent upper and lower balls are partially overlapped.

In a preferred embodiment of the present invention, an upper ball track is provided on the press plate, an upper middle ball track and a lower middle ball track are provided on the moving plate, and a lower ball track is provided on the fixed plate.

In an exemplary embodiment, the upper ball track on the press plate and the upper middle ball track on the moving plate are vertically opposite one another, and an upper ball in the upper ball assembly is located between the upper ball track on the press plate and the upper middle ball track on the moving plate, and in rolling contact with the upper ball track on the press plate and the upper middle ball track on the moving plate.

Furthermore, the lower middle ball track on the moving plate and the lower ball track on the fixed plate are vertically opposite one another, and a lower ball in the lower ball assembly is located between the lower middle ball track on the moving plate and the lower ball track on the fixed plate, and in rolling contact with the lower middle ball track on the moving plate and the lower ball track on the fixed plate; the upper ball track on the press plate is a flat surface ball track, a width thereof being one quarter of a diameter of the upper ball; the upper middle ball track on the moving plate is a circular arc ball track, a radius of the upper middle ball track being greater than a radius of the upper ball; and the lower ball track on the fixed plate is a circular arc ball track, a radius of the lower ball track being less than a radius of the lower ball, such that two-point contact is formed between the lower ball and the lower ball track.

In a preferred embodiment of the present invention, the motor vehicle seat rotation mechanism further comprises a locking device, for locking the fixed plate to the moving plate when adjustment of the motor vehicle rotation mechanism is complete; the locking device is mounted on the connecting plate and located in a space between the connecting plate and an outer edge of the lower anti-detachment hook ring.

In a preferred embodiment of the present invention, the locking device at least comprises a locking pin located in the space between the connecting plate and the outer edge of the lower anti-detachment hook ring, and a locking hole is provided in the lower anti-detachment hook ring; when it is necessary to lock the seat to prevent rotation thereof. The locking pin in the locking device is inserted into the locking hole in the lower anti-detachment hook ring, to achieve locking between the connecting plate and the lower anti-detachment hook ring, and in turn achieve locking between the moving plate and the fixed plate; when it is necessary to rotate the seat, the locking pin in the locking device is pulled out of the locking hole in the lower anti-detachment hook ring.

In a preferred embodiment of the present invention, the locking device further comprises a locking pin mounting box at least having a top side, a first lateral side and a second lateral side, and also comprises an unlocking handle and at least one unlocking tension spring, with the first lateral side and the second lateral side being disposed opposite each other, the top side being connected to a top edge of the first lateral side, the first lateral side and the second lateral side each being provided with at least one locking pin guide hole, and the locking pin guide holes in the first lateral side and the second lateral side having a coaxial relationship with one-to-one correspondence.

In particular, locking pin/s pass/es through the corresponding locking pin guide hole/s in the first lateral side and the second lateral side respectively, a spring bearing boss is provided in a middle position of the locking pin and a locking spring surrounds the locking pin, with the locking spring having one end in contact with the first lateral side and another end in contact with the spring bearing boss; the first end of the locking pin, after passing through the first lateral side, is connected to the unlocking handle by means of the unlocking tension spring, and the second end of the locking pin, after passing through the second lateral side, is inserted into the locking hole in the lower anti-detachment hook ring in a locked state; a first end of the unlocking handle is hinged to the top side of the locking pin mounting box, and the top side of the locking pin mounting box is mounted on the connecting plate in a fixed manner.

In a preferred embodiment of the present invention, the second end of the locking pin has a conical structure.

In a preferred embodiment of the present invention, there are two said locking pins, the locking hole in the lower anti-detachment hook ring is an obround locking hole, the two locking pins are simultaneously inserted into the obround locking hole, and conical surfaces on the two locking pins are in tight contact with arc edges at two ends of the obround locking hole.

According to another aspect, a motor vehicle seat rotation mechanism comprises at least a connecting plate connected to a seat; a moving plate, located below the connecting plate and connected in a fixed manner to the connecting plate; a fixed plate located below the moving plate, the fixed plate being connected to an upper slide rail in a slide rail assembly of the seat; a press plate, located above the moving plate and connected in a fixed manner to the fixed plate; an upper ball assembly located between the press plate and the moving plate; a lower ball assembly located between the moving plate and the fixed plate; wherein a radial separation between a perpendicular axis on which the center of the upper ball in the upper ball assembly is located and a perpendicular axis on which the center of the lower ball in the lower ball assembly is located, is equal to or less than zero.

In particular, the tangent of the upper ball is in parallel with the perpendicular axis of the upper ball and located radially outward of the upper ball with respect to the center axis of the arrangement of the rotation mechanism and the tangent of the lower ball is in parallel with the perpendicular axis of the lower ball and located radially inward of the lower ball with respect to the center axis of the arrangement of the rotation mechanism. The radial distance between the tangents of the upper ball and the lower ball is equal or less than zero. Thus the upper and lower balls may overlap provided that the overlapping edge faces radially inwards or outwards.

In particular, in the case that ΔA=0 than the tangents are identical, in particular congruent wherein the upper and lower balls do not overlap. In the case that ΔA<0 than the tangents are arranged in parallel with each other and with respect to the perpendicular axis wherein the adjacent upper and lower balls are partially overlapped.

According to a further aspect, a motor vehicle seat rotation mechanism, comprises a connecting plate connected to a seat; a moving plate, located below the connecting plate and connected in a fixed manner to the connecting plate; a fixed plate located below the moving plate, the fixed plate being connected to an upper slide rail in a slide rail assembly of the seat; a press plate, located above the moving plate and connected in a fixed manner to the fixed plate; an upper ball assembly located between the press plate and a support of the moving plate; a lower ball assembly located between the moving plate and the fixed plate; wherein a locking device, used for locking the fixed plate to the moving plate when adjustment of the motor vehicle rotation mechanism is complete, is mounted on the connecting plate and located in a space between the connecting plate and an outer edge of the lower anti-detachment hook ring; using the space between the connecting plate and the outer edge of the lower anti-detachment hook ring.

Due to the adoption of the technical solution described above, the motor vehicle seat rotation mechanism of the present invention solves various problems affecting upper and lower steel balls in a force-bearing state in conventional rolling rotation mechanisms, and realizes the arrangement of a novel anti-detachment structure within a design height of the rolling rotation mechanism in the perpendicular direction of H=32 mm, such that the anti-separation strength is greater than 2000 Nm. Furthermore, the present invention uses a novel locking device, such that the locking pin is translationally inserted into the locking hole to achieve locking; the height of the motor vehicle seat rotation mechanism is thereby reduced, and the present invention also has the characteristics of a fast locking response and no gap. In the locking device, the rotary handle unlocking is lifting handle unlocking, which is more in conformity with the operating habits of users.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
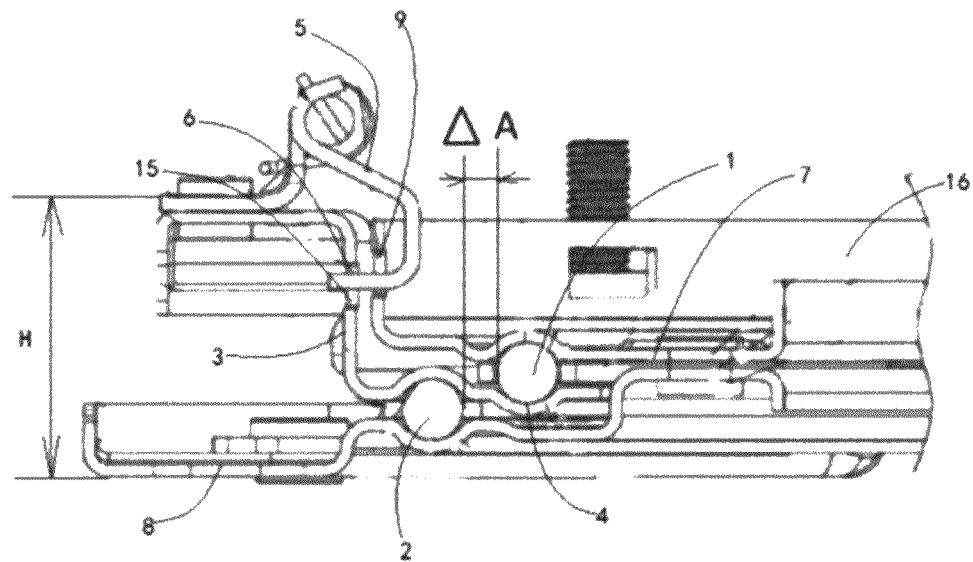
FIG. 1 is a partial sectional view of a rolling rotation mechanism in CN106427682A.
Figure 2:
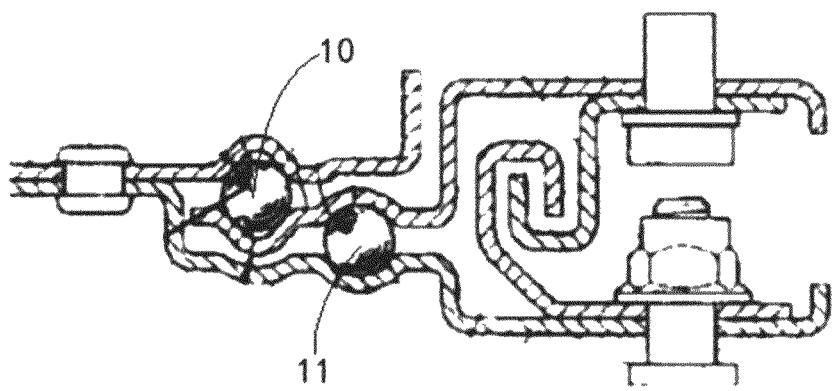
FIG. 2 is a partial sectional view of a rolling rotation mechanism in CN97114364.1.
Figure 3:
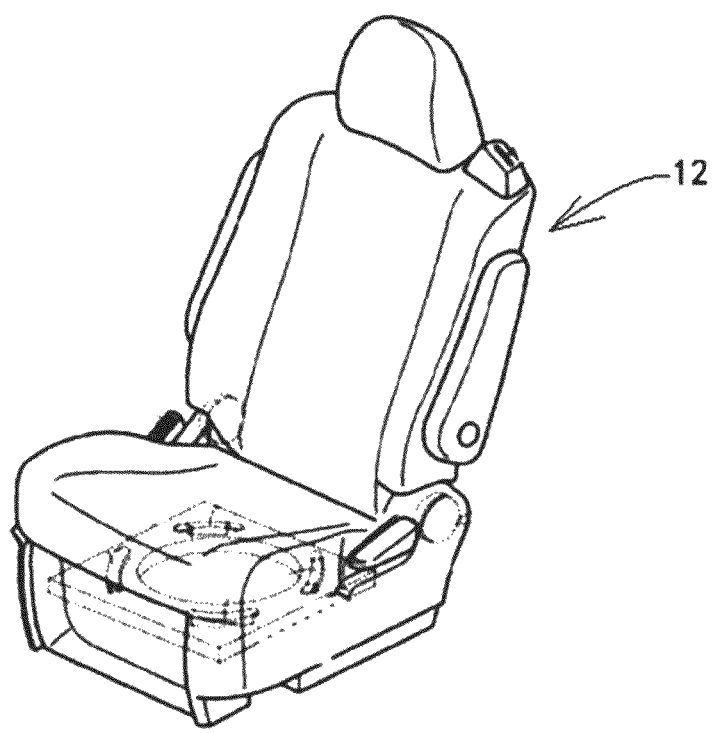
FIG. 3 is a schematic drawing of the external form of an existing middle-row independent seat.
Figure 4:
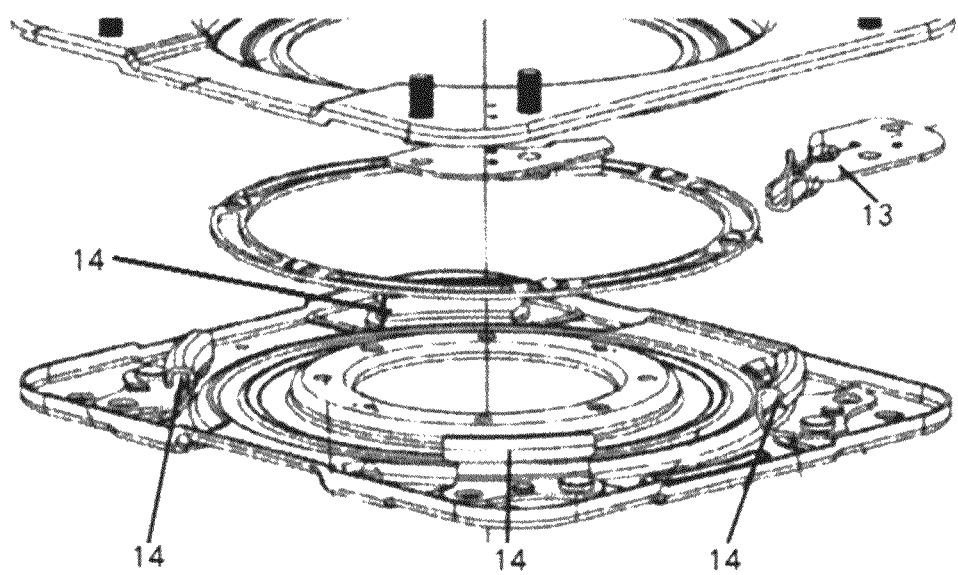
FIG. 4 is a schematic exploded view of a rolling rotation mechanism in an existing middle-row independent seat.
Figure 5:
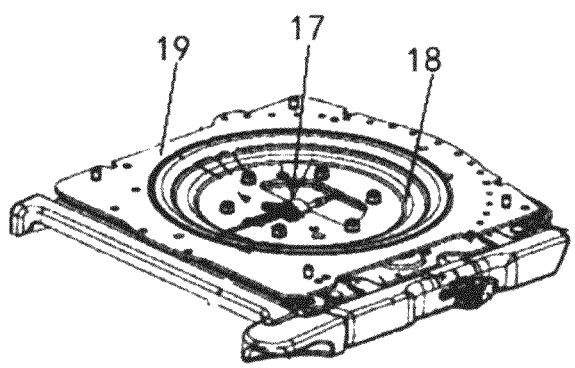
FIG. 5 is a structural schematic diagram of a rolling rotation mechanism of CN103863151B.
Figure 6:
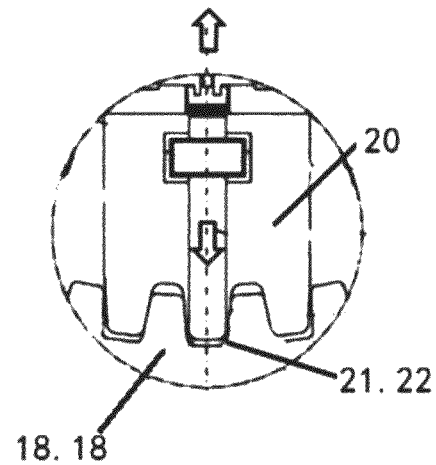
FIG. 6 is a structural schematic diagram of a locking device in the rolling rotation mechanism of CN103863151B.
Figure 7:
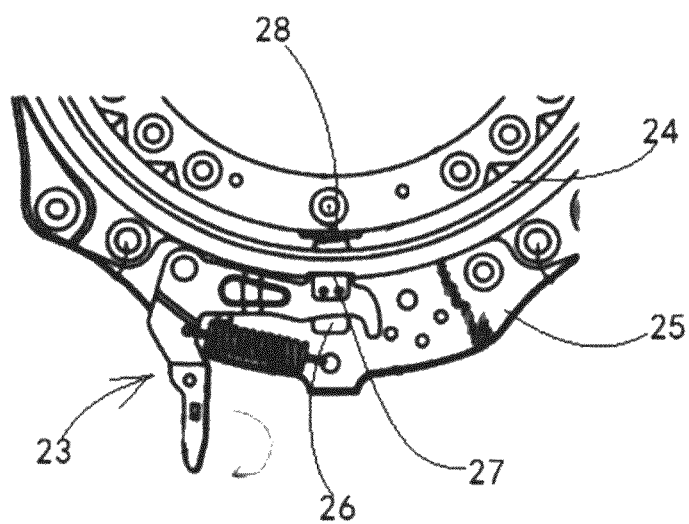
FIG. 7 is a schematic structural diagram of a locking device in a rolling rotation mechanism of CN1189343C.
Figure 8:
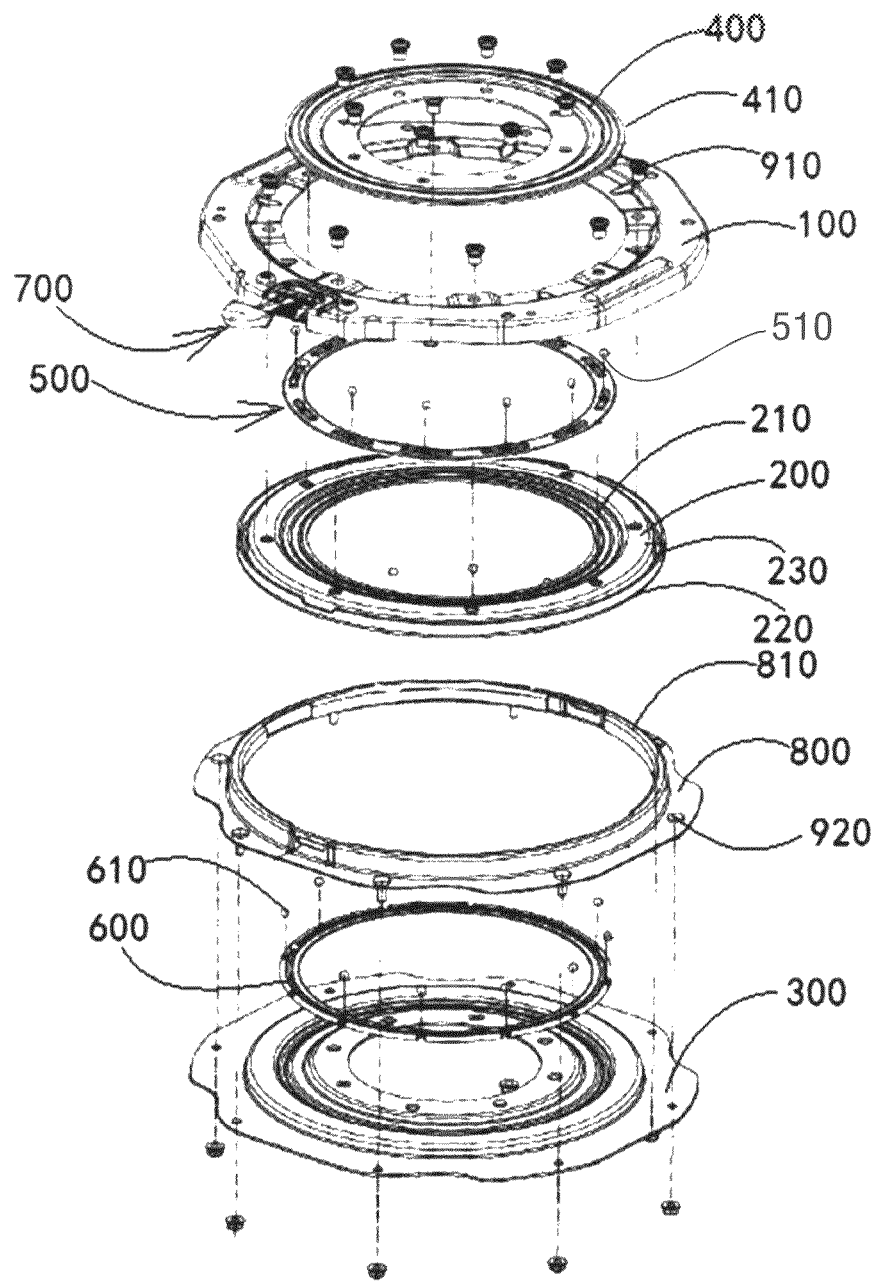
FIG. 8 is a schematic exploded view of a motor vehicle seat rotation mechanism of the present invention.
Figure 9:
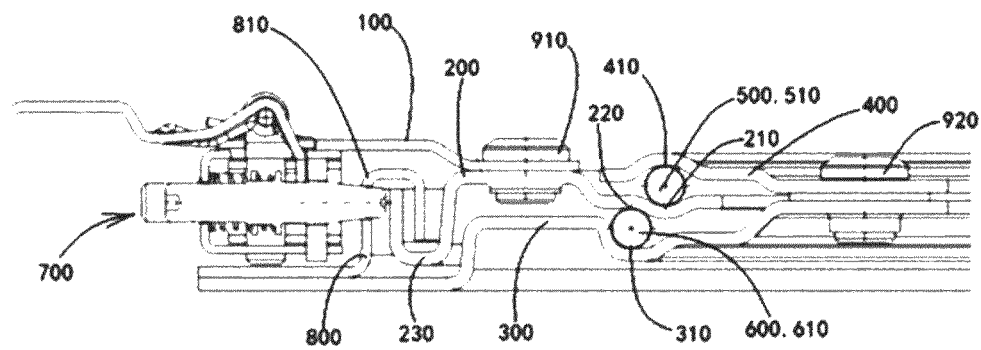
FIG. 9 is a schematic assembly view of a motor vehicle seat rotation mechanism of the present invention.

Referring to FIGS. 8 and 9, the motor vehicle seat rotation mechanism shown in the figures comprises a connecting plate 100, a moving plate 200, a fixed plate 300, a press plate 400, an upper ball assembly 500, a lower ball assembly 600 and a locking device 700.

An annular upper ball track 410 is provided on the press plate 400; an annular upper middle ball track 210 and an annular lower middle ball track 220 are provided on the moving plate 200; an annular lower ball track 310 is provided on the fixed plate 300.

The connecting plate 100 is not only connected in a fixed manner to a seat (not shown in the figures), but also connected in a fixed manner to the moving plate 200 by means of rivets 910, with the moving plate 200 being located below the connecting plate 100. The fixed plate 300 is connected to an upper slide rail (not shown in the figures) in a seat slide rail assembly, and is located below the moving plate 200. The press plate 400 is located above the moving plate 200 and connected in a fixed manner to the fixed plate 300 by means of screws 920.

The upper ball track 410 on the press plate 400 and the upper middle ball track 210 on the moving plate 200 are vertically opposite one another; upper balls 510 in the upper ball assembly 500 are located between the upper ball track 410 on the press plate 400 and the upper middle ball track 210 on the moving plate 200, and are in rolling contact with both ball tracks.

The lower middle ball track 220 on the moving plate 200 and the lower ball track 310 on the fixed plate 300 are vertically opposite one another; lower balls 610 in the lower ball assembly 600 are located between the lower middle ball track 220 on the moving plate 200 and the lower ball track 310 on the fixed plate 300, and are in rolling contact with both ball tracks.

A first characteristic of the motor vehicle seat rotation mechanism of the present invention is that it further comprises a lower anti-detachment hook ring 800, located between the connecting plate 100 and the fixed plate 300 and fixed to the fixed plate 300. An annular lower anti-detachment hook 810, having an inverted U-shape, is provided at an inner edge of the lower anti-detachment hook ring 800; an annular upper anti-detachment hook 230, having a U-shape, is provided at an outer edge of the moving plate 200; the lower anti-detachment hook 810 is placed over the upper anti-detachment hook 230, achieving mutual engagement. When such a structure is subjected to a separating force, the components are in a state whereby the more they are pressed, the tighter they become, instead of a state whereby the more they are pulled, the more open they become, as in a conventional design. At the same time, the lower balls 610 are in a state whereby the more they are enclosed, the tighter they become, instead of having the tendency to come out of the lower middle ball track 220 on the moving plate 200 and the lower ball track 310 on the fixed plate 300.

Figure 10:
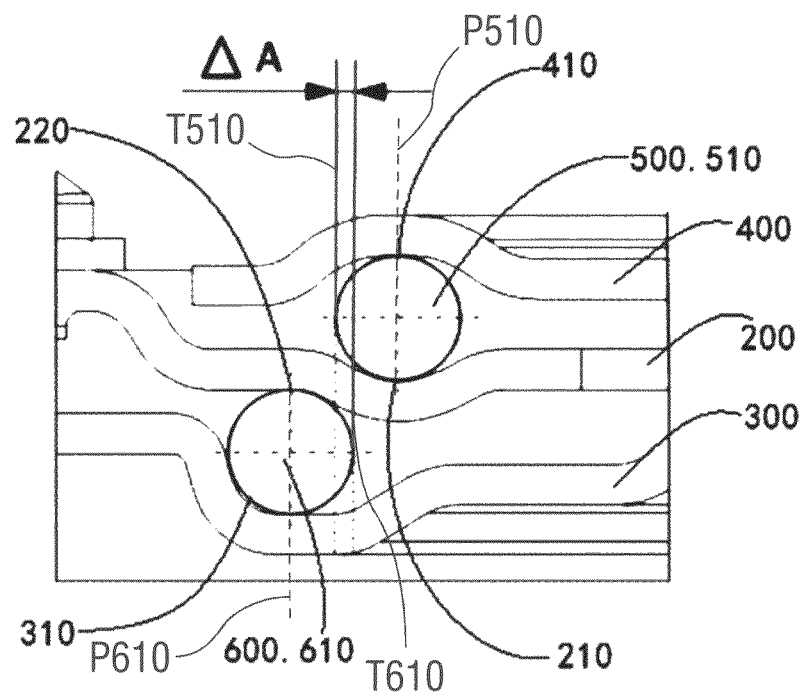
FIG. 10 is a schematic diagram showing the positional relationship of an upper ball and a lower ball in a motor vehicle seat rotation mechanism of the present invention.
Figure 11:
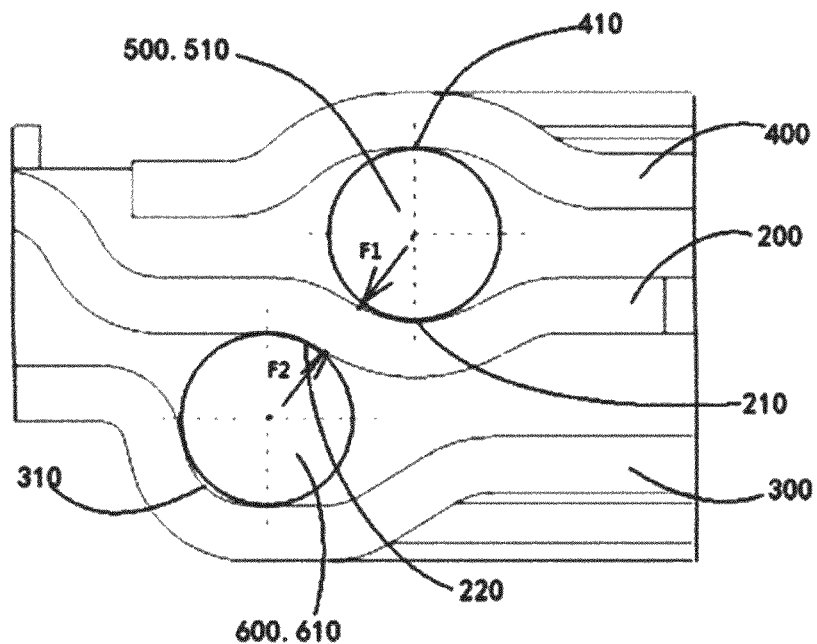
FIG. 11 is a schematic diagram analyzing the forces between an upper ball and a lower ball in a motor vehicle seat rotation mechanism of the present invention.

A second characteristic of the present invention is: referring to FIGS. 10 and 11, a radial separation between a perpendicular axis on which the center of the upper ball 510 in the upper ball assembly 500 is located and a perpendicular axis on which the center of the lower ball 610 in the lower ball assembly 600 is located, $\Delta A \leq 0$, whereas in the known art, $\Delta A > 0$. An advantage of such a design is that under a pressing action, the relationship between the upper ball 510 and the lower ball 610 enables two forces F1 and F2, of equal magnitude but in opposite directions, to cancel each other out, avoiding elastic deformation of travel of the ball track under cantilever action, which would in turn affect the operating precision of the motor vehicle seat rotation mechanism of the present invention.

Figure 13:
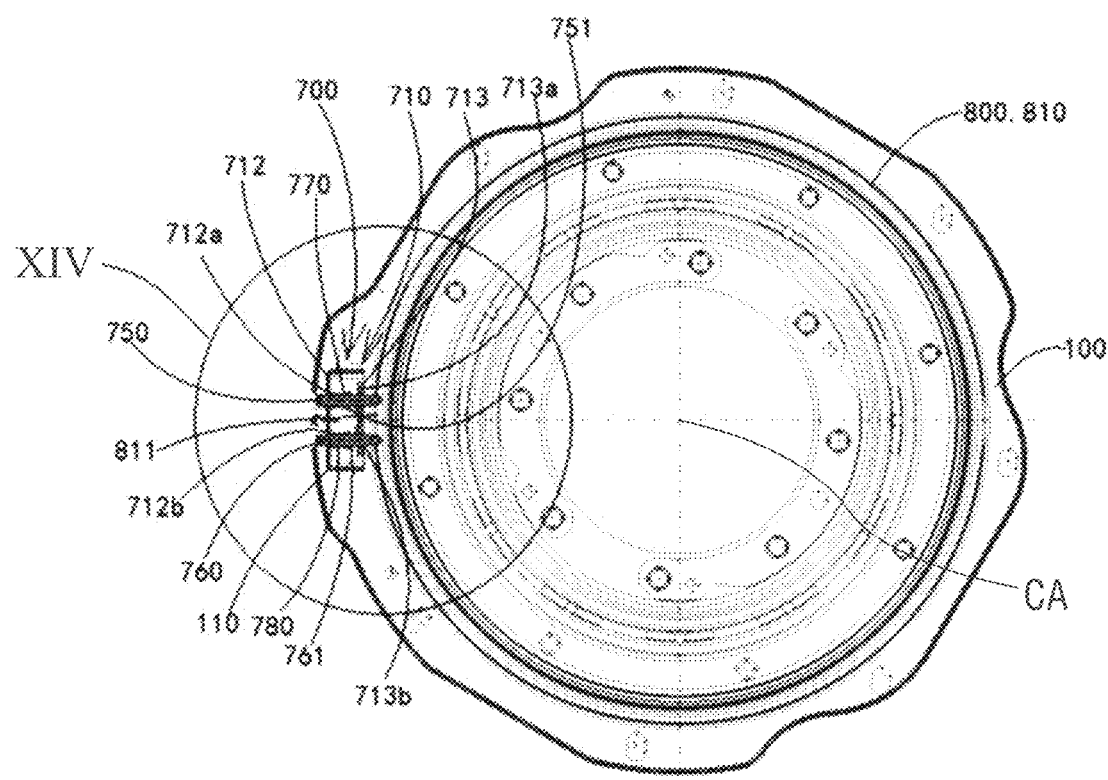
FIG. 13 is a top view of a locking device in a motor vehicle seat rotation mechanism of the present invention, when in a locked state.
Figure 14:
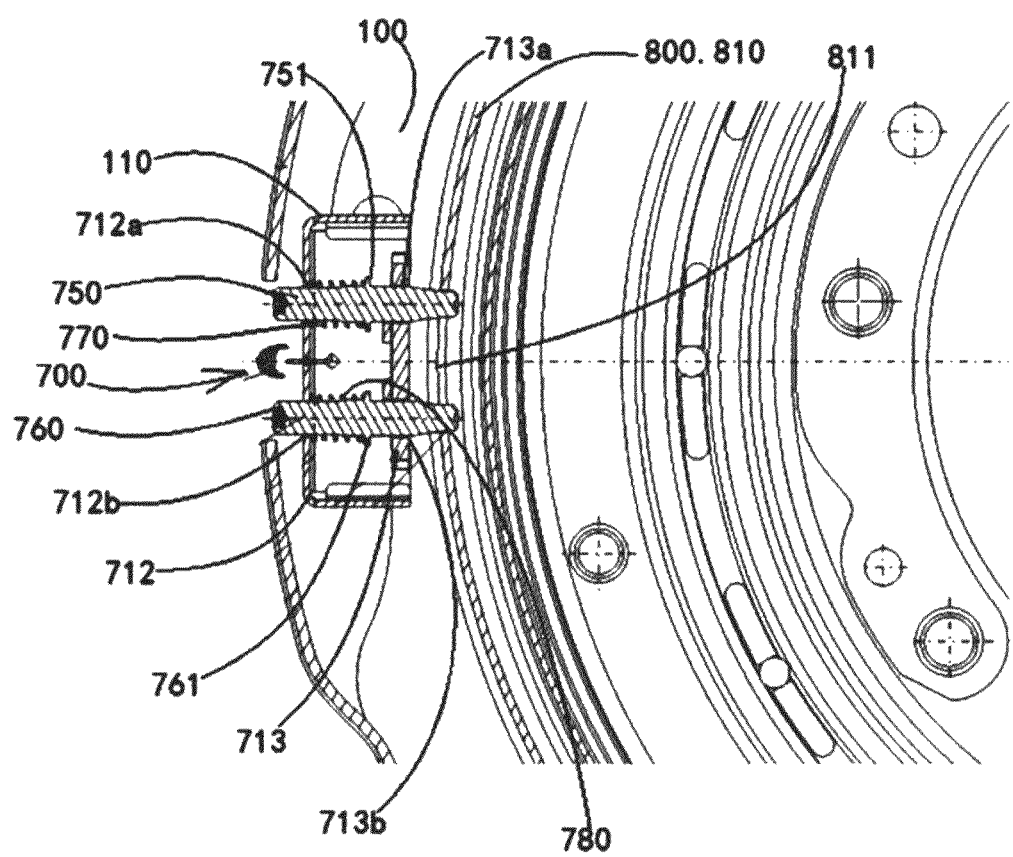
FIG. 14 is an enlarged schematic view of region I in FIG. 13.
Figure 15:
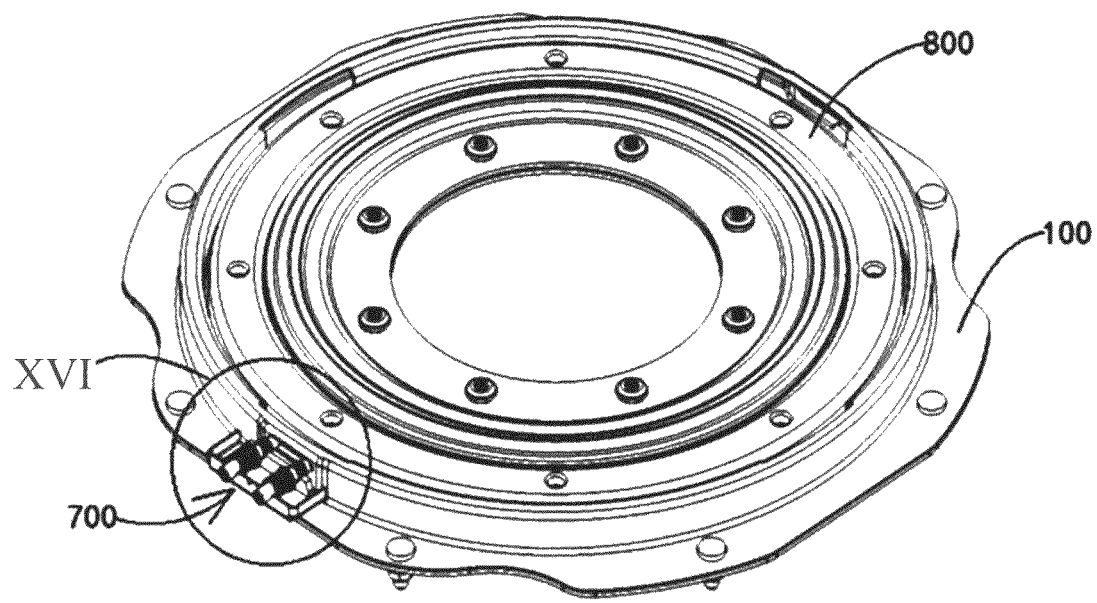
FIG. 15 is a three-dimensional schematic view of a locking device in a motor vehicle seat rotation mechanism of the present invention, when in a locked state.

In particular, the tangent T510 of the upper ball 510 is in parallel with the perpendicular axis P510 of the upper ball 510 and located radially outward of the upper ball 510 with respect to the center axis CA (shown in FIG. 13) of the arrangement of the rotation mechanism. The tangent T610 of the lower ball 610 is in parallel with the perpendicular axis P610 of the lower ball and located radially inwards of the lower ball 610 with respect to the center axis CA of the arrangement of the rotation mechanism. The radial distance $\Delta A$ between the tangents T510, T610 of the upper ball 510 and the lower ball 610 is equal or less than zero. Thus the adjacent upper and lower balls 510, 610 may overlap provided that the overlapping edge faces radially inwards or outwards.

In particular, in the case that $\Delta A = 0$ than the tangents T510, T610 are identical, in particular congruent wherein the upper and lower balls 510, 610 do not overlap. In the case that $\Delta A < 0$ than the tangents T510, T610 are arranged in parallel with each other and with respect to the perpendicular axis P510, P610 wherein the adjacent upper and lower balls 510, 610 are partially overlapped.

Figure 12:
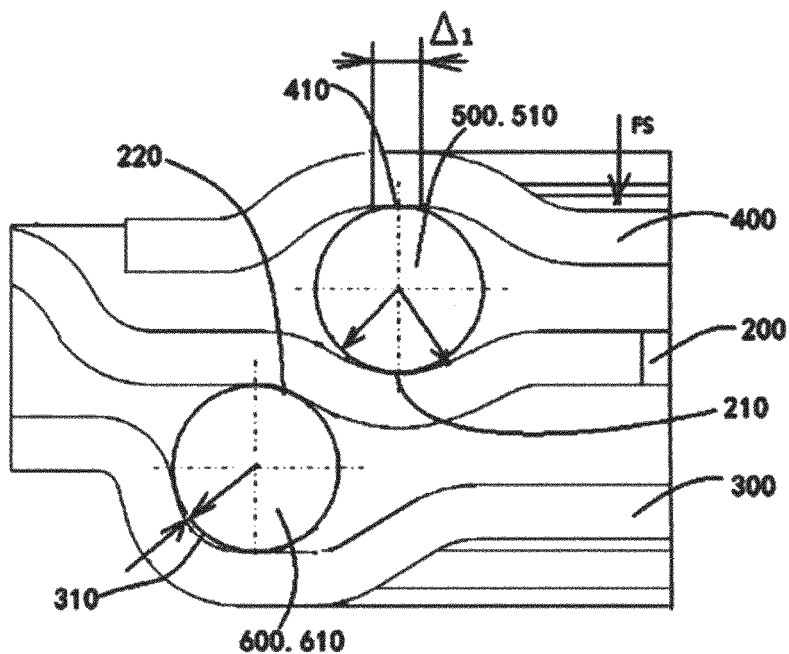
FIG. 12 is an enlarged schematic view of the region of an upper ball and a lower ball in a motor vehicle rotation mechanism of the present invention.

A third characteristic of the present invention is: referring to FIG. 12, when the press plate 400 is tightened by the torque of the tightening screws 920, these apply a tightening force Fs which applies pressure downwards via the upper balls 510, pushing the moving plate 200 and the lower balls 610 towards the fixed plate 300, so that even in the case where the precision with which the ball track is worked has a certain error, the upper balls 510 and lower balls 610 can support each other during movement.

The upper ball track 410 on the press plate 400 is a flat surface ball track, a width thereof being one quarter of a diameter of the upper balls 510; this enables the upper balls 510 to have a certain amount of movement Δ1.

At the same time, the upper middle ball track 210 on the moving plate 200 is a circular arc ball track; a radius R4 of the upper middle ball track 210 is greater than a radius R3 of the upper balls 510, so that under the action of the force Fs, the upper balls 510 force the moving plate 200 to move obliquely downwards to eliminate a tolerance, to a state of zero gap fitting.

The lower ball track 310 on the fixed plate 300 of the present invention is a circular arc ball track; a radius R1 of the lower ball track 310 is less than a radius R2 of the lower balls 610, and when the upper balls 510 force the lower balls 610 to draw close to the center of the lower ball track 310 of the fixed plate 300 by means of the lower middle ball track 220 on the moving plate 200, two-point contact is formed between each lower ball 610 and the lower ball track 310.

A fourth characteristic of the present invention is: the locking device 700, used for locking the fixed plate 300 to the moving plate 200 when adjustment of the motor vehicle rotation mechanism is complete, is mounted on the connecting plate 100 and located in a space between the connecting plate 100 and an outer edge of the lower anti-detachment hook ring 800; using the space between the connecting plate 100 and the outer edge of the lower anti-detachment hook ring 800 to mount the locking device 700 in this way effectively reduces the height H of the motor vehicle seat rotation mechanism.

Referring to FIGS. 13 to 19, a locking device 700 shown in the figures comprises a locking pin mounting box 710 at least having a top side 711, a first lateral side 712 and a second lateral side 713, and also comprises an unlocking handle 720, two unlocking tension springs 730, 740, two locking pins 750, 760 and two locking springs 770, 780.

The first lateral side 712 and the second lateral side 713 are disposed opposite each other; the top side 711 is connected to a top edge of the first lateral side 712; the first lateral side 712 and the second lateral side 713 are each provided with two locking pin guide holes 712a, 712b, 713a, 713b; the locking pin guide holes 712a, 712b, 713a, 713b in the first lateral side 712 and the second lateral side 713 have a coaxial relationship with one-to-one correspondence.

The locking pin 750 passes through the locking pin guide hole 712a in the first lateral side 712 and the locking pin guide hole 713a in the second lateral side 713; the locking pin 760 passes through the locking pin guide hole 712b in the first lateral side 712 and the locking pin guide hole 713b in the second lateral side 713.

Spring bearing bosses 751, 761 are disposed in middle positions of both locking pins 750, 760; the two locking springs 770, 780 surround the locking pins 750, 760 respectively, with the locking springs 770, 780 each having one end in contact with the first lateral side 712, and the other ends being in contact with the spring bearing bosses 751, 761 respectively.

First ends of the locking pins 750, 760, after passing through the first lateral side 712, are connected to the unlocking handle 720 via the unlocking tension springs 730, 740 respectively; second ends of the locking pins 750, 760 have a conical structure. A first end of the unlocking handle 720 is hinged to the top side 711 of the locking pin mounting box 710.

A locking device mounting gap 110 is provided in a certain position on an outer periphery of the connecting plate 100; the top side 711 in the locking device 700 is inserted into the locking device mounting gap 110 and fastened by means of bolts 930. An obround locking hole 811 is provided at a suitable position of the lower anti-detachment hook 810 on the lower anti-detachment hook ring 800; the second ends of the locking pins 750, 760, after passing through the second lateral side 713, are simultaneously inserted into the obround locking hole 811.

Having the locking pins 750, 760 located in the space between the connecting plate 100 and the outer edge of the lower anti-detachment hook ring 800 can further reduce the height H of the motor vehicle seat rotation mechanism.

When it is necessary to lock the seat to prevent rotation thereof, the locking pins 750, 760 in the locking device 700 are inserted into the locking hole 811 in the lower anti-detachment hook ring 800, to achieve locking between the connecting plate 100 and the lower anti-detachment hook ring 800. Since the connecting plate 100 is connected in a fixed manner to the moving plate 200, and the lower anti-detachment hook ring 800 is connected in a fixed manner to the fixed plate 300, locking between the moving plate 200 and the fixed plate 300 can be achieved.

When it is necessary to rotate the seat, the unlocking handle 720 is lifted upward, and the two locking pins 750, 760 are pulled outward from the locking hole 811 in the lower anti-detachment hook ring 800, by means of the two unlocking tension springs 730, 740. After releasing the unlocking handle 720, the two locking pins 750, 760 can be reinserted, under the driving action of the locking springs 770, 780, into the locking hole 811 in the lower anti-detachment hook ring 800 to achieve locking. The two unlocking tension springs 730, 740 drive the unlocking handle 720 to its original position.

Figure 16:
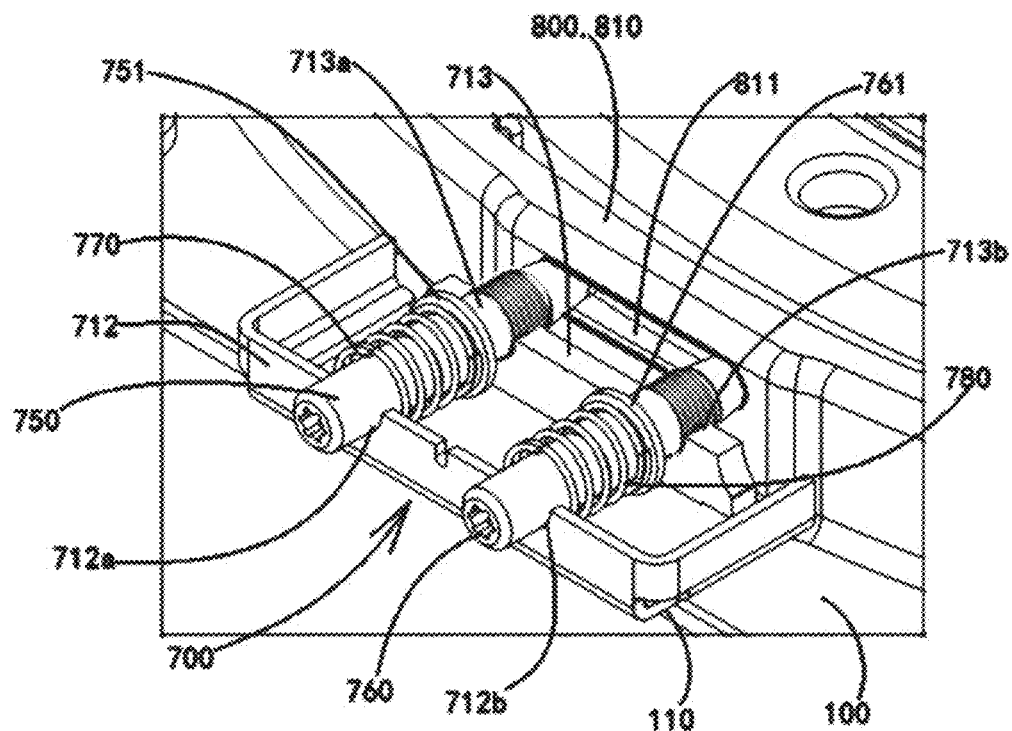
FIG. 16 is an enlarged schematic view of region I in FIG. 15.
Figure 17:
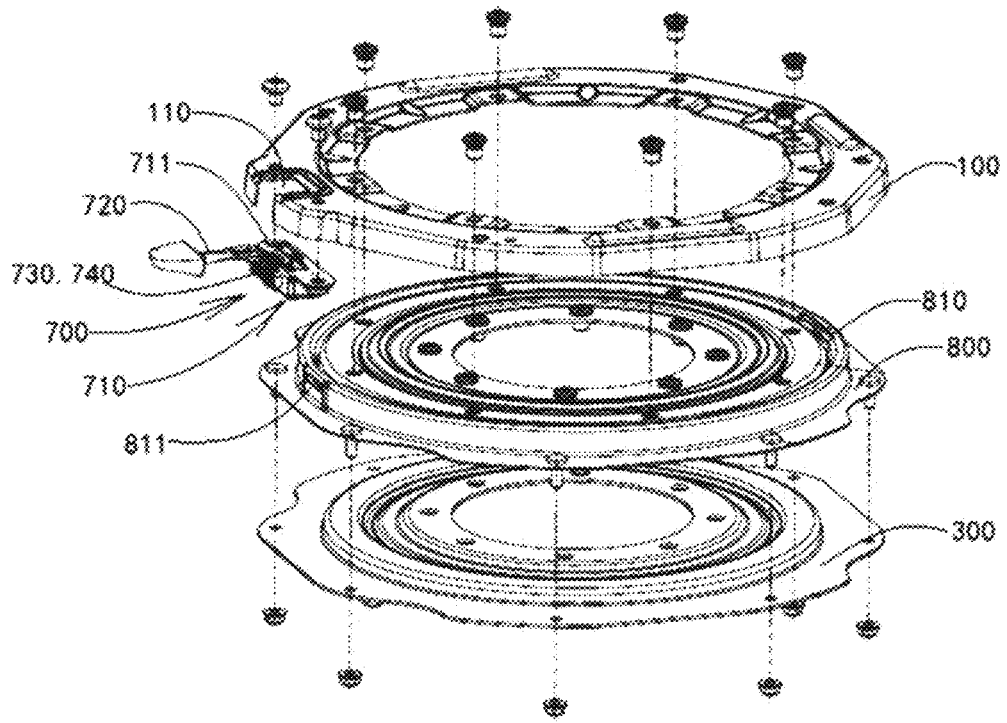
FIG. 17 is a schematic installation diagram of a locking device in a motor vehicle seat rotation mechanism of the present invention.
Figure 18:
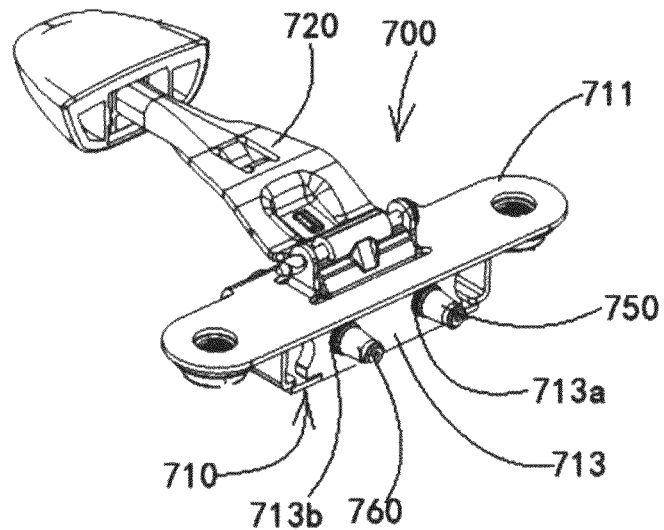
FIG. 18 is a structural schematic diagram of a locking device in a motor vehicle seat rotation mechanism of the present invention, viewed from one direction.
Figure 19:
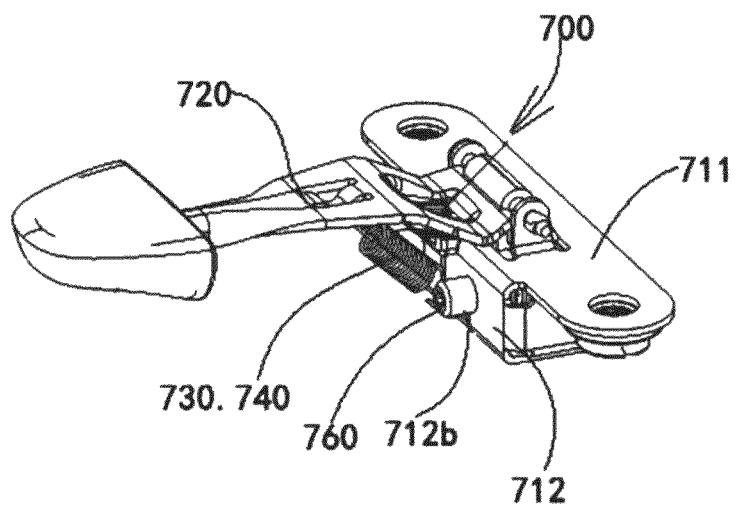
FIG. 19 is a structural schematic diagram of a locking device in a motor vehicle seat rotation mechanism of the present invention, viewed from another direction.

Referring to FIG. 16, the present invention changes the claw-type locking in the prior art to an arrangement in which the two locking pins 750, 760 can be reinserted, under the driving action of the locking springs 770, 780, into the locking hole 811 in the lower anti-detachment hook ring 800 to achieve locking. An advantage of this arrangement is that a hole-and-shaft fit is the form that is most convenient for machining and matching, and satisfactory precision can be attained relatively cheaply.

The two locking pins 750, 760 of the present invention can each extend and retract independently under the driving action of the locking springs 770, 780, whereas multiple protrusions on a one-piece engaging claw "enter and exit together", and complete locking can only be achieved if all of the protrusions enter all of the recesses, so the promptness of locking is inferior to that of the present invention.

Figure 20A:
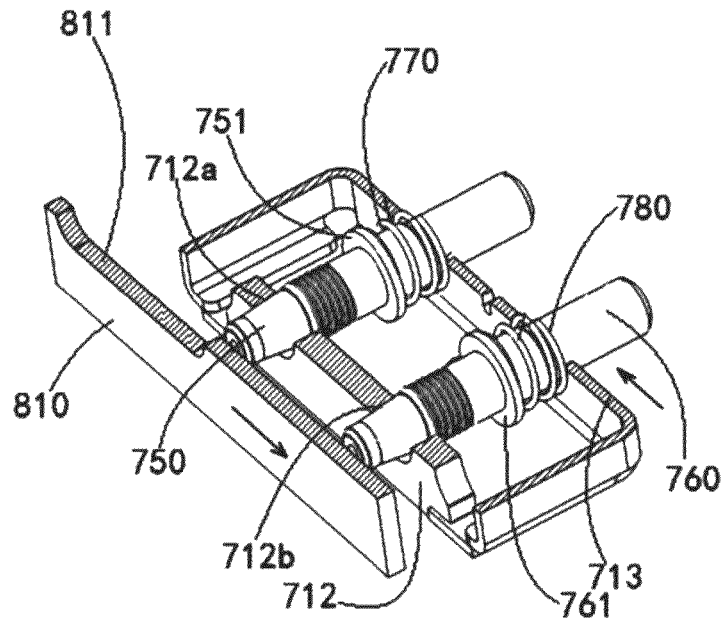
FIGS. 20a, 20b and 20c are schematic procedural diagrams of a locking device in a motor vehicle seat rotation mechanism of the present invention, during entry into the locking hole.
Figure 20B:
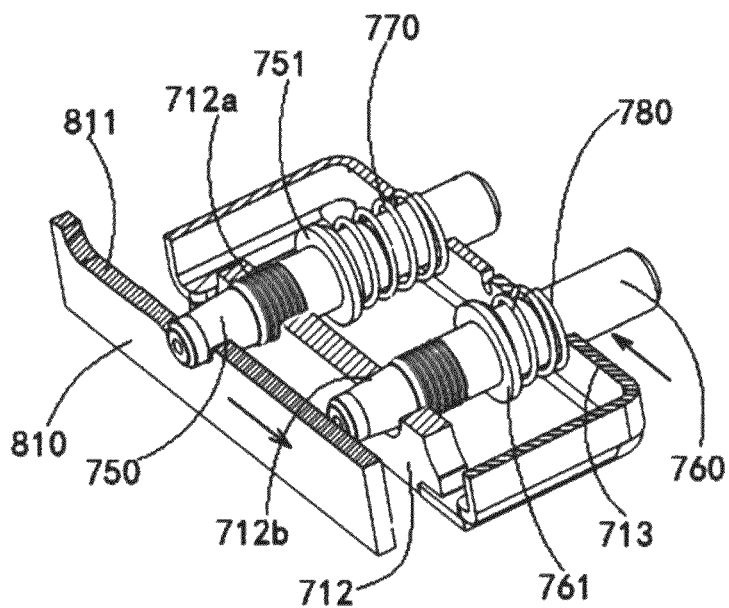
Figure 20C:
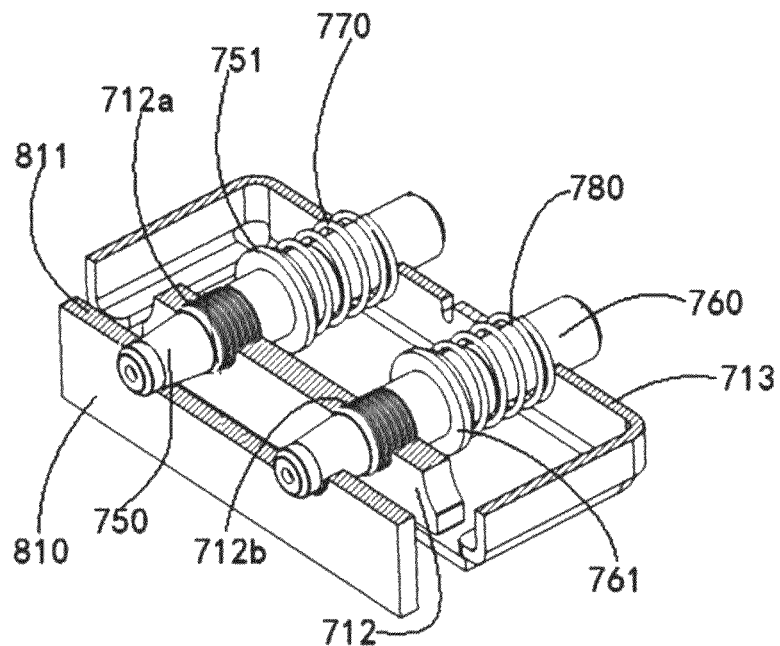

Referring to FIGS. 20a to 20c, in a rotating state, the second ends of the two locking pins 750, 760 of the present invention are both in a retracted state and in contact with an outer surface of the lower anti-detachment hook 810 on the lower anti-detachment hook ring 800; when a locking position is reached, the locking pin 750 rotates to the position of the obround locking hole 811 first, and is inserted into the obround locking hole 811 under the pushing action of the locking spring 770; as the locking device continues to rotate relative to the fixed plate 300, the locking pin 760 also rotates to the position of the obround locking hole 811, and is inserted into the obround locking hole 811 under the pushing action of the locking spring 780. Once the second ends of both locking pins 750, 760 have been inserted into the obround locking hole 811, the locking device 700 can no longer move relative to the fixed plate 300, so locking is achieved.

Figure 21:
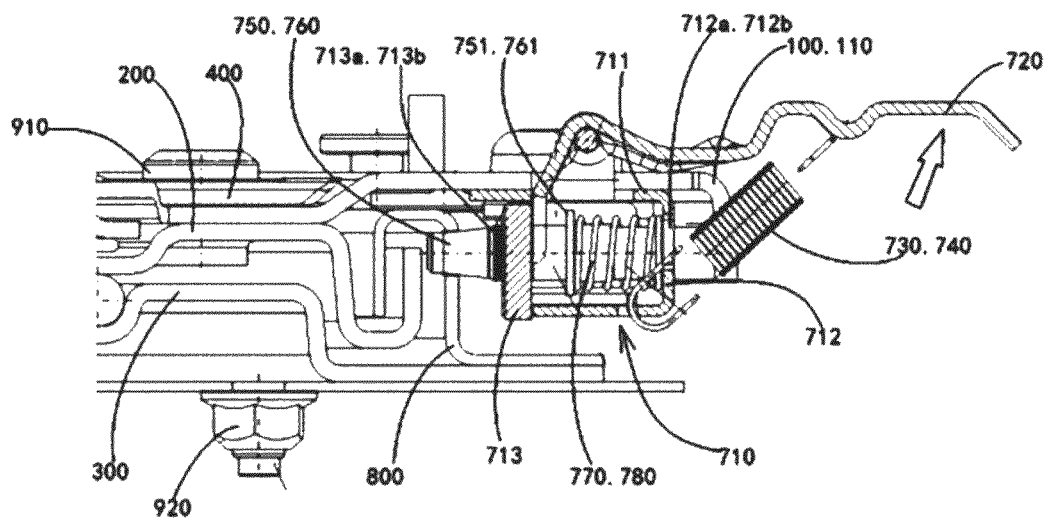
FIG. 21 is a schematic diagram of a locking device in a motor vehicle seat rotation mechanism of the present invention, in a state of being unlocked.

Referring to FIG. 21, the present invention changes the rotary handle in the prior art to the unlocking handle 720 which is lifted upward; the extension and retraction of the two locking pins 750, 760 are controlled by the unlocking handle 720; the unlocking handle 720 is lifted manually; the unlocking handle 720 rotates anticlockwise around a hinge shaft 721 of the unlocking handle and the top side 711; and the unlocking handle 720 pulls the two locking pins 750, 760 by means of the two unlocking tension springs 730, 740 such that the two locking pins are withdrawn outward from the obround locking hole 811. When the unlocking handle 720 is dropped, the two locking pins 750, 760 can be reinserted, under the driving action of the locking springs 770, 780, into the locking hole 811 in the lower anti-detachment hook ring 800 to achieve locking; the structure is very simple, and the pulling-up of the unlocking handle 720 is more in conformity with the operating habits of users.

Figure 22:
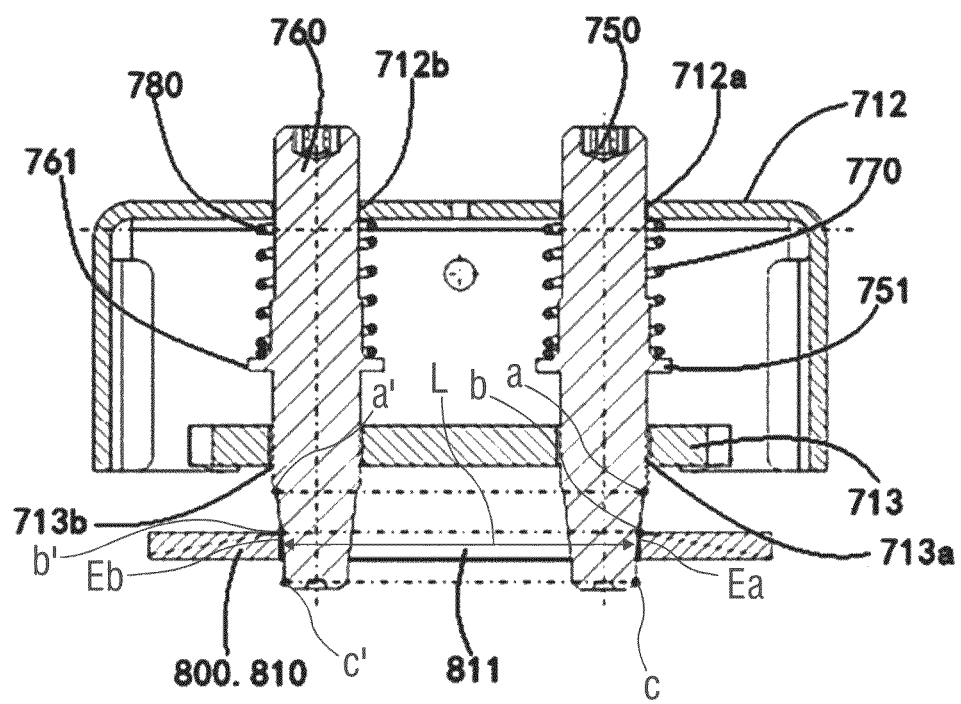
FIG. 22 is a schematic diagram of a state of locking between two locking pins and an obround locking hole in a locking device in a motor vehicle seat rotation mechanism of the present invention.
Figure 23:
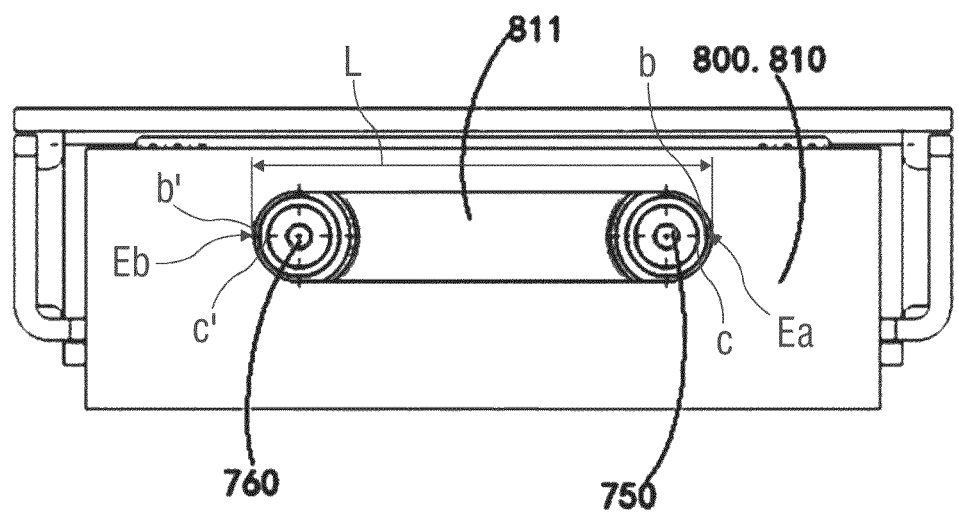
FIG. 23 is a schematic view of FIG. 22 in direction A.

Referring to FIGS. 22 and 23, the second ends of the two locking pins 750, 760 both have a conical structure; supposing that a length between two arc edges Ea, Eb at two ends of the obround locking hole 811 is L, a length of a line connecting guide points C, C' of the two locking pins 750, 760 is 0.8 mm less than the value of L, cone-shape starting points of the two locking pins 750, 760 are b, b', a length of a line connecting the cone-shape starting points b, b' of the two locking pins 750, 760 is 0.5 mm less than the value of L, cone-shape ending points of the two locking pins 750, 760 are a, a', a length of a line connecting the cone-shape end points a, a' of the two locking pins 750, 760 is 1.2 mm greater than the value of L; thus, under the combined action of the two locking pins 750, 760, it can be ensured that some point between the cone-shape starting points b, b' and the cone-shape ending points a, a' of the two locking pins 750, 760 will be in tight contact with the arc edges Ea, Eb at the two ends of the obround locking hole 811, i.e. in a "zero" gap fit, so gaps are eliminated.

While specific embodiments of the invention have been shown and described in detail to illustrate the application of the principles of the invention, it will be understood that the invention may be embodied otherwise without departing from such principles.

What is claimed is:

1. A motor vehicle seat rotation mechanism comprising:
a connecting plate connectable to a seat;
a moving plate located below the connecting plate and fixedly connected to the connecting plate;
a fixed plate located below the moving plate, the fixed plate being connected to an upper slide rail in a slide rail assembly of the seat;
a press plate located above the moving plate and fixedly connected to the fixed plate;
an upper ball assembly located between the press plate and the moving plate;
a lower ball assembly located between the moving plate and the fixed plate;
a lower anti-detachment hook ring, located between the connecting plate and the fixed plate, and fixed to the fixed plate;
an annular lower anti-detachment hook provided at an inner edge of the lower anti-detachment hook ring; and
an annular upper anti-detachment hook provided at an outer edge of the moving plate, the lower anti-detachment hook and the upper anti-detachment hook being engaged with each other.

2. A motor vehicle seat rotation mechanism according to claim 1, wherein:
the lower anti-detachment hook has an inverted U-shape;
the upper anti-detachment hook has a U-shape; and
the inverted U-shape of the lower anti-detachment hook is placed over the U-shape of the upper anti-detachment hook.

3. A motor vehicle seat rotation mechanism according to claim 1, wherein a radial separation between a perpendicular axis on which a center of an upper ball in the upper ball assembly is located, and a perpendicular axis on which a center of a lower ball in the lower ball assembly is located, is less equal to or less than zero.

4. A motor vehicle seat rotation mechanism according to claim 1, wherein:
an upper ball track is provided on the press plate;
an upper middle ball track and a lower middle ball track are provided on the moving plate;
a lower ball track is provided on the fixed plate;
the upper ball track on the press plate and the upper middle ball track on the moving plate are vertically opposite one another.

5. A motor vehicle seat rotation mechanism according to claim 4, wherein an upper ball in the upper ball assembly is located between the upper ball track on the press plate and the upper middle ball track on the moving plate and in rolling contact with the upper ball track on the press plate and the upper middle ball track on the moving plate.

6. A motor vehicle seat rotation mechanism according to claim 5, wherein the upper ball track on the press plate is a flat surface ball track, a width thereof being one quarter of a diameter of the upper ball.

7. A motor vehicle seat rotation mechanism according to claim 1, wherein the lower middle ball track on the moving plate and the lower ball track on the fixed plate are vertically opposite one another, and a lower ball in the lower ball assembly is located between the lower middle ball track on the moving plate and the lower ball track on the fixed plate, and in rolling contact with the lower middle ball track on the moving plate and the lower ball track on the fixed plate.

8. A motor vehicle seat rotation mechanism according to claim 7, wherein:
the upper middle ball track on the moving plate is a circular arc ball track, a radius of the upper middle ball track being greater than a radius of the upper ball; and
the lower ball track on the fixed plate is a circular arc ball track, a radius of the lower ball track being less than a radius of the lower ball, such that two-point contact is formed between the lower ball and the lower ball track.

9. A motor vehicle seat rotation mechanism according to claim 1, further comprising a locking device, for locking the fixed plate to the moving plate when adjustment of the motor vehicle rotation mechanism is complete, wherein the locking device is mounted on the connecting plate and located in a space between the connecting plate and an outer edge of the lower anti-detachment hook ring.

10. A motor vehicle seat rotation mechanism according to claim 9, wherein the locking device comprises:
a locking pin located in the space between the connecting plate and the outer edge of the lower anti-detachment hook ring; and a locking hole in the lower anti-detachment hook ring, whereby to lock the seat to prevent rotation thereof, the locking pin is inserted into the locking hole in the lower anti-detachment hook ring, to achieve locking between the connecting plate and the lower anti-detachment hook ring, and to achieve locking between the moving plate and the fixed plate to rotate the seat, the locking pin is pulled out of the locking hole in the lower anti-detachment hook ring.

11. A motor vehicle seat rotation mechanism according to claim 9, wherein the locking device further comprises:
a locking pin located in the space between the connecting plate and the outer edge of the lower anti-detachment hook ring;
a locking pin mounting box comprising a top side, a first lateral side and a second lateral side with the first lateral side and the second lateral side being disposed opposite each other, the top side being connected to a top edge of the first lateral side, the first lateral side and the second lateral side each being provided with at least one locking pin guide hole and the locking pin guide holes in the first lateral side and the second lateral side having a coaxial relationship with one-to-one correspondence;
an unlocking handle; and
at least one unlocking tension spring, wherein the locking pin passes through the corresponding locking pin guide holes in the first lateral side and the second lateral side, a spring bearing boss is provided in a middle position of the locking pin and a locking spring surrounds the locking pin, with the locking spring having one end in contact with the first lateral side and another end in contact with the spring bearing boss, a first end of the locking pin, after passing through the first lateral side, is connected to the unlocking handle by the unlocking tension spring, and a second end of the locking pin, after passing through the second lateral side, is inserted into the locking hole in the lower anti-detachment hook ring in a locked state;
a first end of the unlocking handle is hinged to the top side of the locking pin mounting box, and the top side of the locking pin mounting box is fixedly mounted on the connecting plate.

12. A motor vehicle seat rotation mechanism according to claim 11, wherein the second end of the locking pin has a conical structure.

13. A motor vehicle seat rotation mechanism according to claim 12, wherein:

the locking device further comprises another locking pin to provided two locking pins;
the locking hole in the lower anti-detachment hook ring is an obround locking hole;
the two locking pins are together inserted into the obround locking hole; and
conical surfaces on the two locking pins are in tight contact with arc edges at two ends of the obround locking hole.

14. A motor vehicle seat rotation mechanism comprising:
a connecting plate connectable to a seat;
a moving plate located below the connecting plate and fixedly connected to the connecting plate;
a fixed plate located below the moving plate, the fixed plate being connected to an upper slide rail in a slide rail assembly of the seat;
a press plate, located above the moving plate and fixedly connected to the fixed plate;
an upper ball assembly located between the press plate and the moving plate;
a lower ball assembly located between the moving plate and the fixed plate;
a locking device, for locking the fixed plate to the moving plate when an adjustment of the motor vehicle rotation mechanism is complete, mounted on the connecting plate and located in a space between the connecting plate and an outer edge of a lower anti-detachment hook ring, whereby the space between the connecting plate and the outer edge of the lower anti-detachment hook ring is used.

15. A motor vehicle seat rotation mechanism, comprising:
a connecting plate connectable to a seat;
a moving plate, located below the connecting plate and fixedly connected to the connecting plate;
a fixed plate located below the moving plate, the fixed plate being connected to an upper slide rail in a slide rail assembly of the seat;
a press plate, located above the moving plate and fixedly connected to the fixed plate;
an upper ball assembly located between the press plate and the moving plate;
a lower ball assembly located between the moving plate and the fixed plate, wherein a radial separation between a perpendicular axis on which a center of the upper ball in the upper ball assembly is located and a perpendicular axis on which a center of the lower ball in the lower ball assembly is located, is equal to or less than zero.

\* \* \* \* \*